United States Patent [19]
Yamamoto et al.

[11] Patent Number: 5,287,585
[45] Date of Patent: Feb. 22, 1994

[54] WIPER APPARATUS WITH MOTOR ADJUSTABLE LIMIT POSITIONS

[75] Inventors: Tokihiko Yamamoto, Kariya; Ryoichi Fukumoto, Nagoya; Kazuhiro Sumiya, Hekinan; Masao Ohhashi, Kariya, all of Japan

[73] Assignee: Aisin Seiki Kabushiki Kaisha, Kariya, Japan

[21] Appl. No.: 675,968

[22] Filed: Mar. 27, 1991

[30] Foreign Application Priority Data

Mar. 31, 1990 [JP] Japan ................................. 2-85897

[51] Int. Cl.$^5$ ............................ B60S 1/04; A47L 1/00
[52] U.S. Cl. .................. 15/250.13; 15/250.3; 74/43; 74/600; 74/522; 74/828
[58] Field of Search ........... 15/250.13, 250.16, 250.17, 15/250.19, 250.27, 250.3, 250.23; 74/42, 43, 71, 600, 602, 828, 522, 571 M, 836, 70, 75

[56] References Cited

U.S. PATENT DOCUMENTS

| | | | |
|---|---|---|---|
| 4,787,114 | 11/1988 | Okudaira | 15/250.13 |
| 4,934,014 | 6/1990 | Yamamoto | 15/250.13 |
| 4,947,507 | 8/1990 | Naiki | 15/250.16 |
| 5,031,265 | 7/1991 | Nakatsukasa | 15/250.13 |

FOREIGN PATENT DOCUMENTS 6382860 4/1988 Japan .

Primary Examiner—Stephen F. Gerrity
Assistant Examiner—Gary K. Graham
Attorney, Agent, or Firm—Finnegan, Henderson, Farabow, Garrett & Dunner

[57] ABSTRACT

A windshield wiper apparatus for a vehicle includes a rotatably supported main shaft to which a wiper arm is secured, a main lever secured to the main shaft, a cam member arranged eccentrically about the main shaft, a plate turnably supported on the main lever, a subordinate lever having one end arranged about the cam member and another end connected to the plate, an arm turnably supported on the plate and having a joint to which a wiper drive mechanism is connected, and a turnover spring arranged between the plate and the arm for holding the arm at a predetermined position. If the wiper arm is moved by wind force during operation at high vehicle velocity, this motion is compensated for by adjusting the oscillation sweep of the arm in such a manner that the wiper arm will reverse direction at its normal upper reversal point. The wiper arm is thus prevented from striking the vehicle pillar, without reducing visibility through the windshield.

4 Claims, 5 Drawing Sheets

WIPER APPARATUS WITH MOTOR ADJUSTABLE LIMIT POSITIONS

BACKGROUND OF THE INVENTION

1. Field of the Invention

This invention relates to a wiper apparatus for wiping the windshield of a vehicle.

2. Description of the Prior Art

A known example of a conventional wiper apparatus of this type is disclosed in the specification of Japanese Patent Application Laid-Open (KOKAI) No. 63-82860. This conventional wiper apparatus includes a rotatably supported main shaft to which a wiper arm is secured, a lever secured to the main shaft, and a drive mechanism connected to the lever via a rod. The rod is pushed and pulled by operation of the drive mechanism, and the main shaft is rotated via the lever by the pushing and pulling of the rod. As a result, the wiper arm is swept back and forth between upper and lower reversal points to wipe off a windshield.

Ordinarily, the upper reversal point of the wiper arm is set just short of the pillar of the vehicle in order to assure good visibility. With a wiper apparatus of this type, however, considerable wind force acts upon the wiper arm when the apparatus is used at, say, a high vehicle traveling velocity. As a consequence, the wiper arm may overshoot the normal upper reversal point owing to the force of the wind and reverse at a position beyond this point. This can cause the wiper blade to strike the vehicle pillar and sustain damage as a result. There is also the danger that the wiper arm may swing beyond the pillar and operate abnormally.

SUMMARY OF THE INVENTION

Accordingly, an object of the present invention is to provide a wiper apparatus in which striking of the pillar due to overshooting of the wiper arm can be prevented without detracting from visibility.

According to the present invention, the foregoing object is attained by providing a wiper apparatus which includes a rotatably supported main shaft to which a wiper arm is secured, a main lever secured to the main shaft, a cam member arranged eccentrically about the main shaft, a plate turnably supported on the main lever via a first pin, a subordinate lever having one end arranged about the cam member and another end connected to the plate via a second pin, an arm turnably supported on the plate via a third pin and having a joint portion to which a wiper drive mechanism is connected, and a turnover spring arranged between the plate and the arm for holding the arm at a predetermined position.

In operation, the cam member is caused to rotate at the upper reversal point, whereby the plate attempts to rotate along with the arm about the first pin via the subordinate lever. However, since the plate and the arm are connected to the wiper drive mechanism via the joint portion, the result is that the main lever turns. In other words, the position of the wiper arm at the upper reversal point is held back from the normal position by an amount equivalent to the turning angle of the main lever. As a result, even if the wiper arm is moved by the force of the wind, as when the vehicle is traveling at high velocity, motion of the wiper arm due to wind force is compensated for by the amount of hold-back mentioned above, and therefore the wiper arm reverses at the normal upper reversal point. As a result, the wiper arm can be prevented from striking the pillar without detracting from visibility.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

Figure 1:
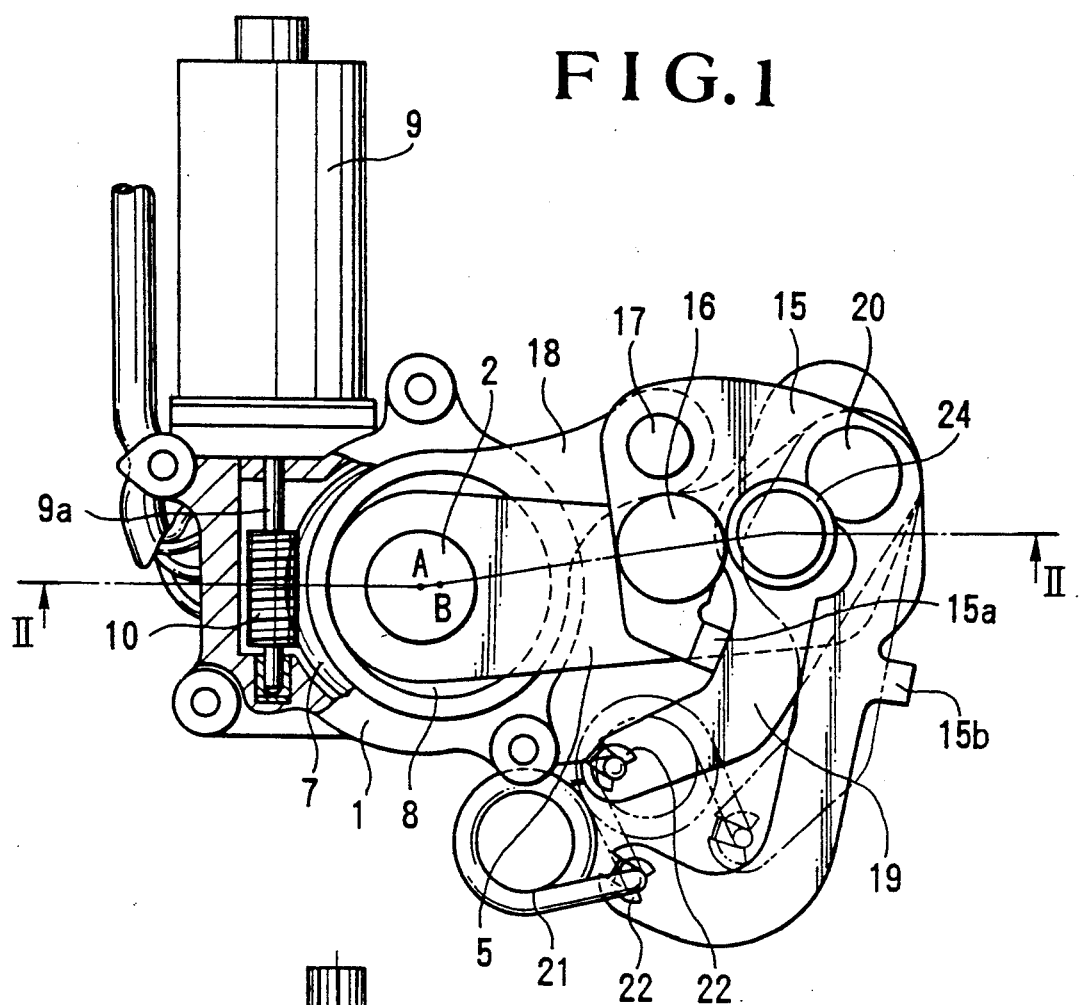
FIG. 1 is a plan view illustrating an embodiment of a wiper apparatus according to the present invention.
Figure 2:
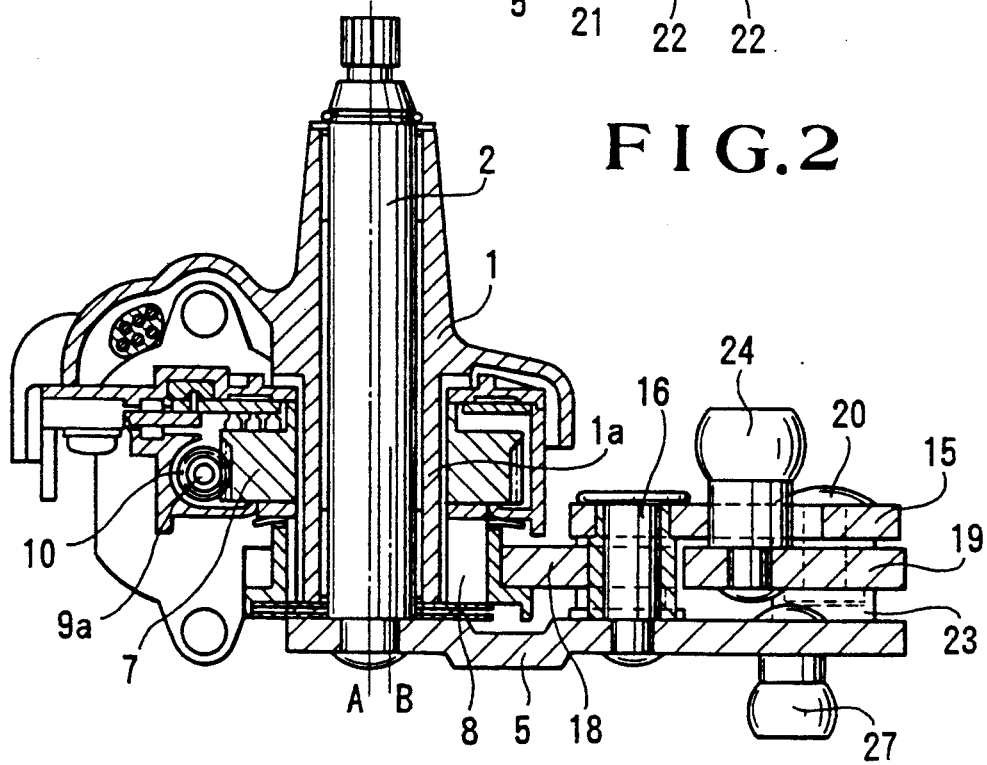
FIG. 2 is a sectional view taken along line II—II of FIG. 1.
Figure 3:
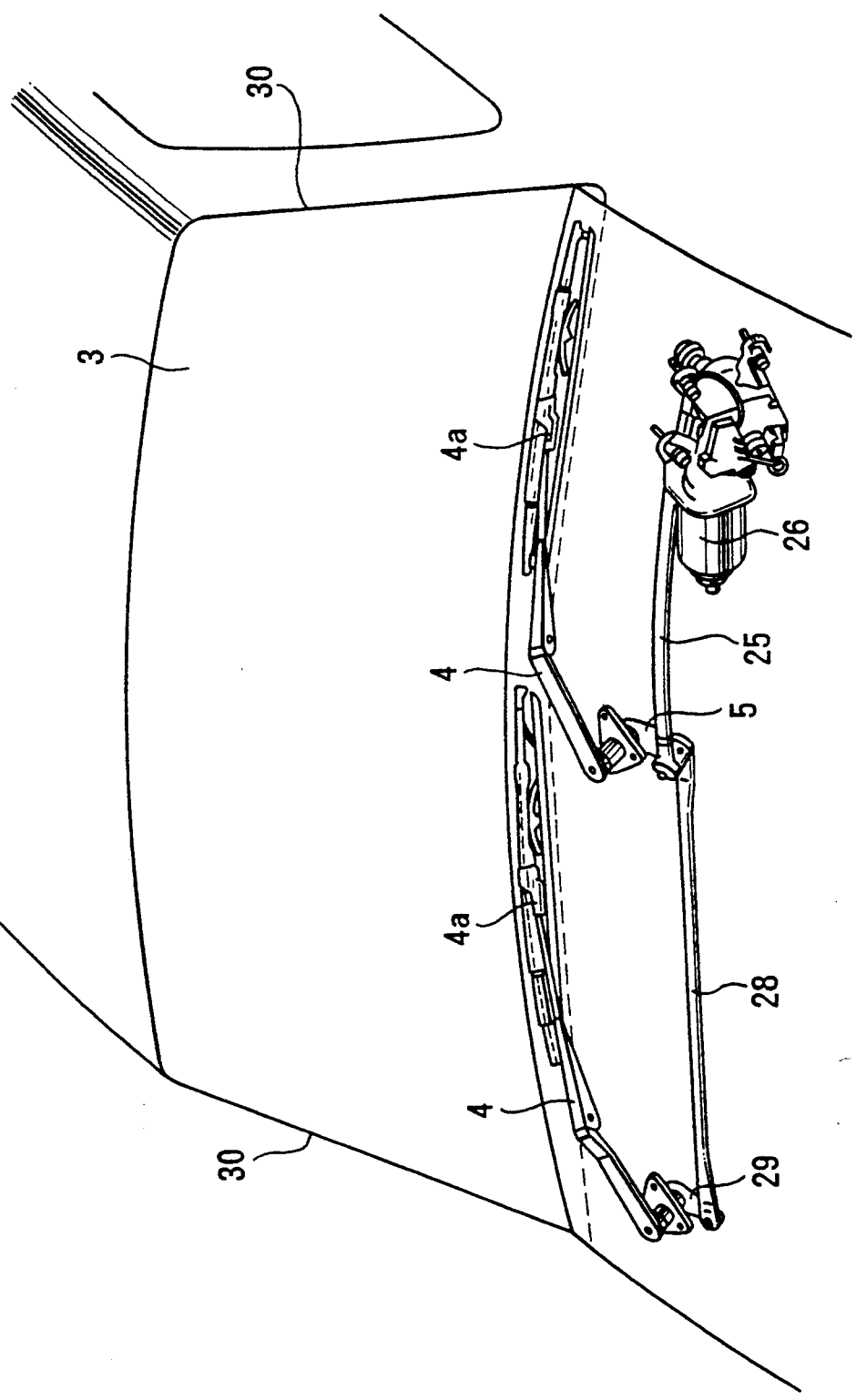
FIG. 3 is a perspective view illustrating the wiper apparatus mounted on a vehicle.

As shown in FIGS. 1 through 3, the wiper apparatus of the invention includes a housing 1 in which a main shaft 2 is rotatably supported. A wiper arm 4 has a distal end to which is secured a wiper blade 4a for wiping a windshield 3. The wiper arm 4 is secured to one end of the main shaft 2 so as to be co-rotatable therewith. A main lever 5 is secured to the other end of the main shaft 2 so as to be co-rotatable therewith. The housing 1 has a shaft 1a axially supporting the main shaft 2. A gear 7, which is coaxial with a central axis A about which the main shaft 2 rotates, is rotatably supported about the shaft 1a. An eccentric cam 8, which has a central axis of rotation B offset from the rotational axis A of the main shaft 2, is formed integral with the gear 7 and is rotatably supported about the shaft 1a axially supporting the main shaft 2. Thus, the gear 7, eccentric cam 8 and main lever 5 are arranged, in the order mentioned as seen from above, about the main shaft 2. Therefore, offsetting of the main shaft 2 is eliminated, the transmission of driving force from a wiper drive motor 26, described below, is performed more efficiently, and the structure about the main shaft 2 is made more compact.

Figure 9:
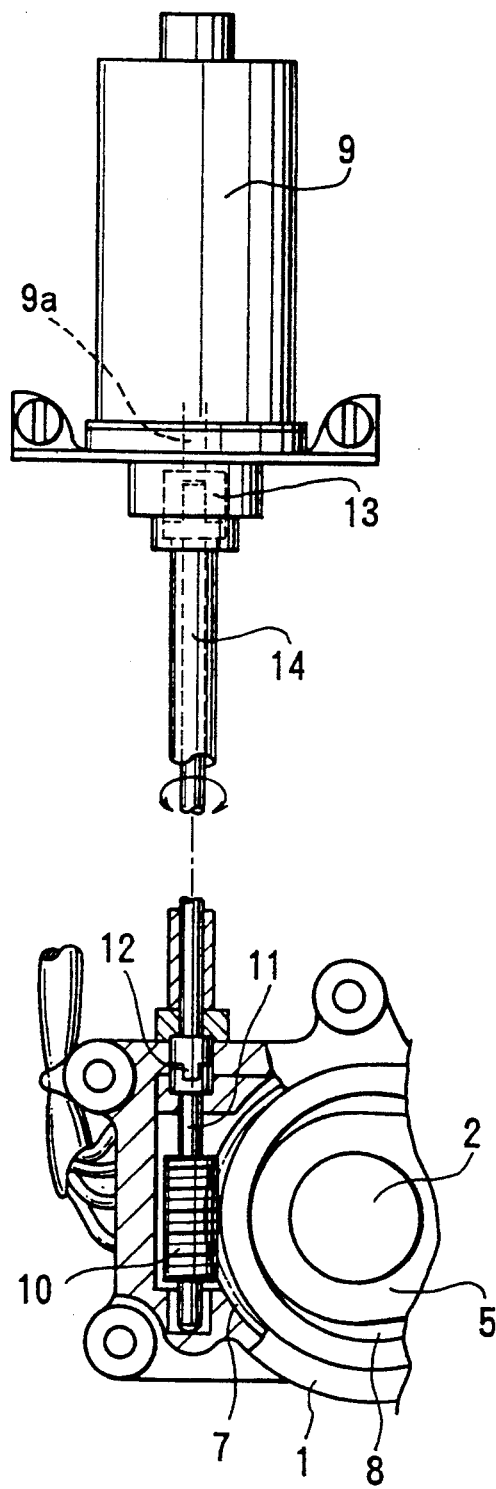
FIG. 9 is a plan view showing another embodiment of the present invention.

A motor 9 secured to the housing 1 and has a rotary shaft 9a to which a worm 10 meshing with the gear 7 is secured so as to rotate with the shaft 9a. As illustrated in FIG. 9 showing another embodiment, the worm can be secured to a rotary shaft 11, and the rotary shaft and rotary shaft 9a of the motor 9 can be connected by connecting members 12, 13 and a cable 14. As a result, the motor 9 can be made a member separate from the housing 1, thereby making it easier to install the motor in the vehicle and making it possible to freely set the mounting position of the motor 9. As a result, vibration of the motor 9 and abnormal noise produced by such vibration can be prevented by fixedly securing the motor 9 to a rigid portion of the vehicle.

Figure 4:
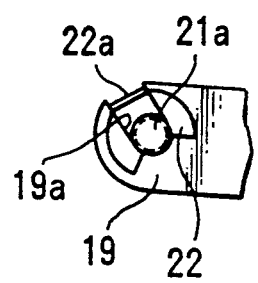
FIG. 4 is a plan view illustrating an engaging portion of a turnover spring.
Figure 5:
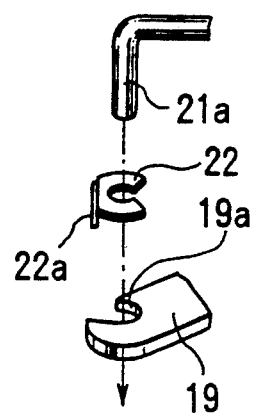
FIG. 5 is an exploded perspective view of FIG. 4.
Figure 6:
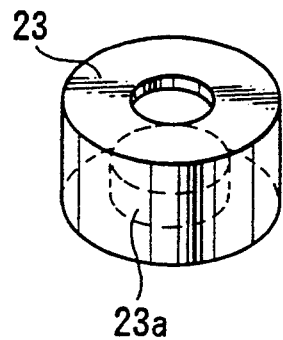
FIG. 6 is a perspective view of a block.

A plate 15 is pivotally supported on the main lever 5 by a pin 16. One end of a subordinate lever 18 is pivotally supported on the plate 15 by a pin 17, and the other end of the subordinate lever 18 is turnably supported about the eccentric cam 8. An arm 19 is pivotally supported on the plate 15 by a pin 20. In turning from side to side, the arm 19 comes into abutting contact with stoppers 15a, 15b formed on the plate 15. These stoppers thus limit the range of turning motion of the arm 19. A turnover spring 21 is disposed between the plate 15 and the arm 19 and has one end fastened to the arm 19 and its other end fastened to the plate 15. Two positions of the arm 19 are defined by the turnover spring 21. As shown in FIGS. 4 and 5, the arm 19 is formed to have a notch 19a, and the turnover spring 21 has a hook 21a. The one end of the turnover spring 21 is fastened to the arm 19 by inserting the hook 21a into the notch 19a, and press fitting a ring 22, which has a leg 22a that will fit into the notch 19a, onto the hook 21a. The other end of the turnover spring 21 is fastened to the plate 15 in a similar manner. As a result, the turnover spring 21 is prevented from falling out. Further, a block 23 shown in FIG. 6 is arranged between the main lever 5 and the arm 21 and secured by a pin 20. This is to prevent the main lever 5, arm 19 and plate 15 from developing play at the time of operation. The block 23 is formed to have a grease reservoir 23a to be filled with grease so that the main lever 5 and arm 19 will move smoothly.

A joint 24 is fixed to the arm 13. The wiper drive motor 26 is connected to the joint 24 via a rod 25. Further, a joint 27 is fixed to the main lever 5. An main lever 29 of another wiper apparatus is connected to the joint 27 via a rod 28.

The operation of the wiper apparatus constructed as set forth above will now be described with reference to FIGS. 1, 3, 7 and 8.

Figure 7:
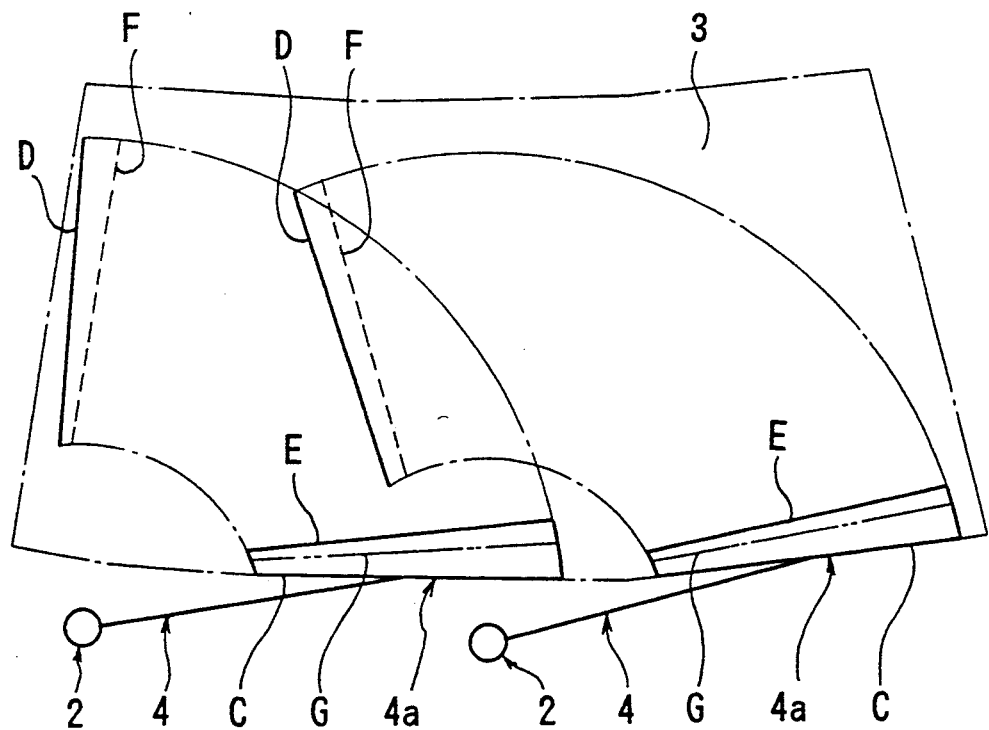
FIG. 7 is a schematic view showing the operation of a wiper arm.
Figure 8:
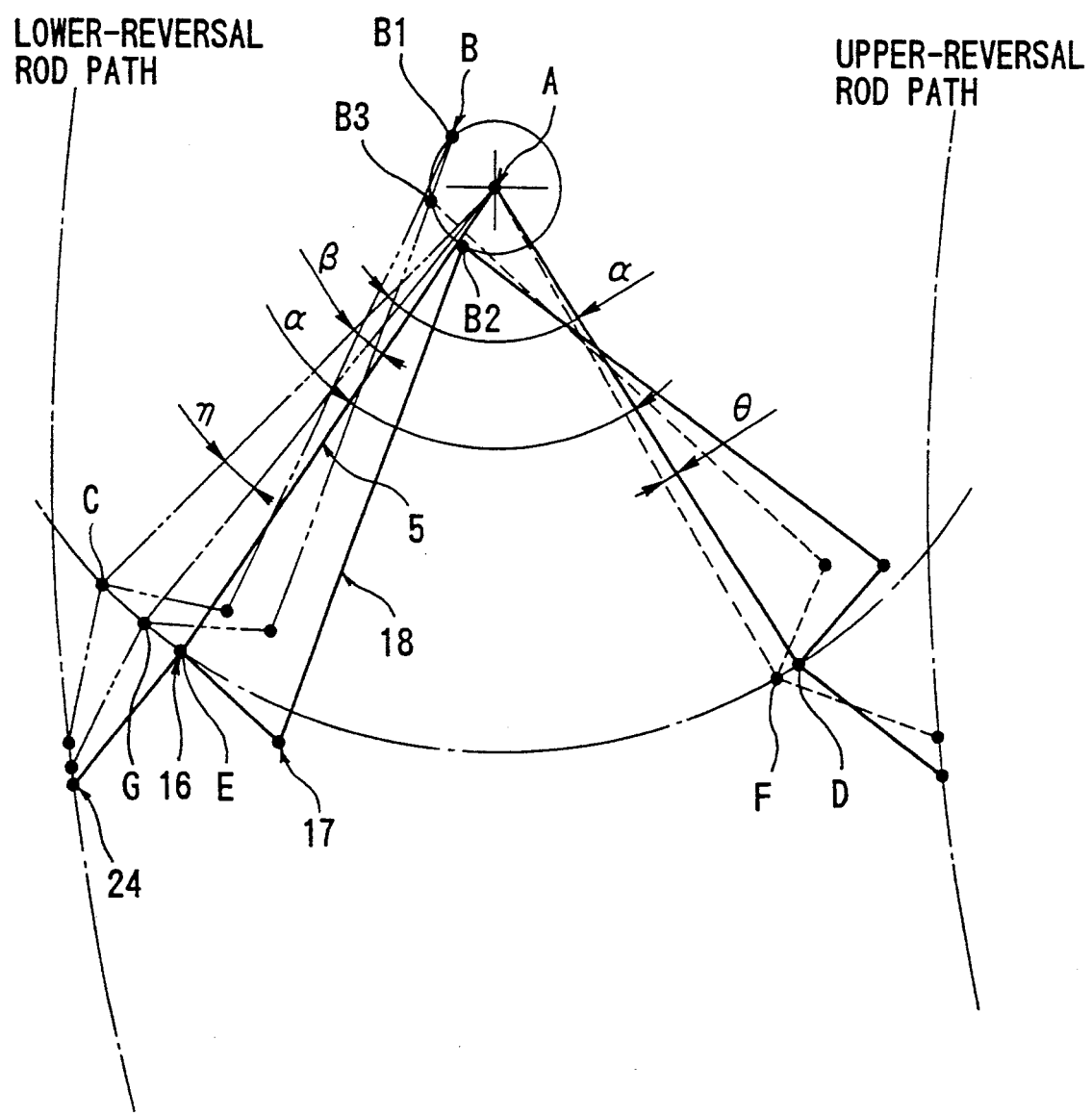
FIG. 8 is a schematic view showing the operation of a main lever and a subordinate lever.

With the wiper apparatus accommodated in the fully concealed state shown in FIG. 3 (i.e., when the wiper arm 4 is at a fully concealed position C in FIG. 7), the user actuates the wiper drive motor 26 by turning on a wiper actuating switch (not shown). When this done, the rods 25, 28 are pushed so that the main levers 5, 29 turn by an angle $\alpha$ from positions corresponding to the fully concealed position C of the wiper arm 4. Owing to this turning motion of the main levers 5, 29, the wiper arm 4 turns about the central axis of rotation A via the main shaft 2 and assumes a usual upper reversal point D. In the course of this operation, the motor 9 is actuated at the same time as the wiper drive motor 26, as a result of which the gear 7 turns via the worm 10. Owing to the turning motion of the gear 7, the eccentric cam 8 rotates along with it so that its central axis of rotation B moves from an accommodated position B1 to a position B2 of an ordinary wiping angle. Owing to the rotation of eccentric cam 8, the subordinate lever 18 is pulled so that the plate 15 and arm 19 turn about the pin 16. However, since the positions which the arm 19 and plate 15 can assume are limited by the connection between the joint 24 and the rod 25, the result is that the main lever 5 turns through an angle $\beta$ to set an ordinary lower reversal point E of the wiper arm 4. Further, when the wiper drive motor 26 is actuated, the rods 25, 28 are pulled and the main levers 5, 29 turn by an angle $\gamma$ from a position corresponding to the upper reversal point to the wiper arm 4. Owing to the turning motion of the main levers 5, 29, the wiper arm 4 turns about the central axis of rotation A via the main shaft 2 and assumes the ordinary lower reversal point E. Until the wiper actuating switch is turned off, the wiper arm 4 will thenceforth turn back and forth between the ordinary upper reversal point D and ordinary lower reversal point E owing to the back and forth turning motion, indicated by the solid lines in FIG. 8, of the main levers 5 and 29 (the main lever 29 is not shown in FIG. 8). As a result, the windshield 3 between the two reversal points D and E is wiped by the wiper blade 4a.

When the vehicle travels at high velocity and a signal indicative thereof enters from a velocity sensor (not shown) during the above operation of the wiper apparatus as shown for example in U.S. Pat. No. 4,934,014, the motor 9 is actuated and the gear 7 turns via the worm 10. Owing to the turning of gear 7, the eccentric cam 8 co-rotates so that its central axis of rotation B shifts from the position B2 of the ordinary wiping angle to a position B3 of a narrower wiping angle. Owing to rotation of the eccentric cam 8, the subordinate lever 8 is pulled so that the plate 15 and arm 19 turn about the pin 16. However, since the positions which the arm 19 and plate 15 can assume are limited by the connection between the joint 24 and the rod 25, the result is that the main lever 5 turns through an angle $\theta$ to set an upper reversal point F of a narrower angle. Accordingly, the upper reversal of the wiper arm 4 takes place at the upper reversal point F of the narrower angle. This point is located at a position held back from the usual upper reversal point D. Thus, when the vehicle is traveling at high velocity, the wiper arm 4 reverses at the narrow-angle upper reversal point F held back from the usual upper reversal point D. As a consequence, even if the wiper arm 4 is moved by the force of wind, the movement of the wiper arm 4 due to this wind force is compensated for by an amount equivalent to the angle $\theta$, and therefore the reversal takes place as the ordinary upper reversal point D. As a result, collision between the wiper blade 4a and pillar 30 can be avoided, damage to and malfunctioning of the wiper blade 4a can be prevented, and the windshield 3 is wiped up to the ordinary upper reversal point D so that there is no loss in visibility. It is possible to adopt an arrangement in which the operation of the motor 9 for setting the narrow-angle upper reversal point F is not limited to the time at which the vehicle is traveling at high velocity. For example, the motor 9 can be actuated in operative association with the wiping speed of the wiper arm.

When the wiper actuating switch is turned off, the operations performed are the reverse of the foregoing. Specifically, the central axis of rotation B of eccentric cam 8 moves from the position B2 of the ordinary wiping angle to the accommodated position B1 to set the fully concealed position C. The wiper arm 4 assumes the fully concealed state and the wiper drive motor 26 stops, thereby halting the wiping operation. When snow or the like clogs the accommodating area of the wiper arm 4 so that the wiper arm cannot be accommodated in the fully concealed state, an external force that resists the driving force of the wiper drive motor 26 acts upon the wiper arm 4, namely the main lever 5. Owing to this external force, the plate 15 turns about the pin 20. Since the arm 19 is positionally limited by the connection between the joint 24 and the rod 25, the main lever 5 turns through an angle $\eta$ to set a semi-concealed position G. The main lever 5 is restrained at this position by action of the turnover spring 21. As a result, the wiper arm 4 is accommodated in a semi-concealed state at a semi-concealed position G. Thus, in a case where the wiper arm 4 cannot be accommodated in the fully concealed state because of snow clogging the accommodating area, the wiper arm 4 is accommodated automatically in the semi-concealed state. Accordingly, an excessive load will not be applied to the wiper arm 4 and wiper drive motor 26, thereby making it possible to prevent damage to them. In addition, this operation does not rely upon the eccentric cam 8 but is achieved by a change in the relative position of the arm 19 to which the joint 24 is affixed and the plate 15 to which the main lever 5 is connected. Consequently, the overall apparatus is reduced in size without enlarging the amount of offset of the eccentric cam 8 and the output of the motor 9, the eccentric cam 8 can be formed integral with the gear 7, and strength is improved.

Owing to the construction of the wiper apparatus according to the invention described above, the position of the wiper arm 4 at the upper reversal point can be held back from the normal position. As a result, even if the wiper arm 4 is moved by the force of the wind, as when the vehicle is traveling at high velocity, motion of the wiper arm due to wind force is compensated for by the amount of hold-back mentioned above, and therefore the wiper arm 4 is capable of reversing at the normal upper reversal point. As a result, the wiper blade can be prevented from striking the pillar 30 so that damage to or malfunctioning of the wiper blade can be avoided without detracting from visibility. In addition, in a case where the wiper arm 4 cannot be accommodated in the fully concealed state because of snow clogging the accommodating area, the wiper arm 4 can be accommodated automatically in the semi-concealed state by a change in the relative position of the arm 19 to which the joint 24 is affixed and the plate 15 to which the main lever 5 is connected. Accordingly, an excessive load will not be applied to the wiper arm 4 and wiper drive motor 26, thereby making it possible to prevent damage to them. In addition, this operation does not rely upon the eccentric cam 8 but can be achieved by a change in the relative position of the arm 19 to which the joint 24 is affixed and the plate 15 to which the main lever 5 is connected. Consequently, the overall apparatus is reduced in size without enlarging the amount of offset of the eccentric cam 8 and the output of the motor 9, the eccentric cam 8 can be formed integral with the gear 7, and strength is improved.

As many apparently widely different embodiments of the present invention can be made without departing from the spirit and scope thereof, it is to be understood that the invention is not limited to the specific embodiments thereof except as defined in the appended claims.

What is claimed is:

1. A wiper apparatus for a vehicle, comprising:
   an elongated main shaft rotatably supported for rotation about a shaft axis;
   a wiper blade supporting wiper arm secured to said main shaft;
   a main lever secured to one end of said main shaft;
   a eccentric member rotatable about said shaft axis;
   a plate turnably supported on said main lever by a first pin spaced from said shaft axis;
   a subordinate lever having one end supported by said eccentric member and another end connected to said plate by a second pin spaced from said first pin and said shaft axis so that rotation of said eccentric member about said main shaft axis moves said second pin relative to said first pin to change the position of said plate;
   a drive arm turnably supported on said plate by a third pin and having a joint portion connected to a reciprocating drive mechanism;
   a turnover spring operative between said plate and said drive arm for holding said drive arm at one of a first position, at which said wiper arm is accommodated in a fully concealed state in normal operation of said wiper arm, and a second position at which said wiper arm is accommodated in a semi-concealed state when an excessive load is applied to said wiper arm and said wiper blade by the reciprocating drive mechanism; and
   motor means including a motor coupled to said cam for rotating said eccentric cam through a selected angle in response to one of vehicle speed and wiper blade speed to change a pivot position of the main lever relative to the drive arm by movement of the subordinate lever.

2. A wiper apparatus according to claim 1 in which said third pin, for rotatably connecting said plate with said drive arm, extends to a block in slidable contact with the surface of said main plate, said block defining a grease reservoir.

3. A wiper apparatus according to claim 2 wherein said first pin is reciprocally moved to a predetermined locus relative to said shaft axis for each of the first position, the second position and a third lower reversal position.

4. A wiper apparatus according to claim 3 in which the locus of the first pin for the second position is located between the locus of the first pin for the first position and the locus of the first pin for the lower reversal position.

* * * * *

UNITED STATES PATENT AND TRADEMARK OFFICE
CERTIFICATE OF CORRECTION

PATENT NO. : 5,287,585
DATED : February 22, 1994
INVENTOR(S) : TOKIHIKO YAMAMOTO ET AL.

It is certified that error appears in the above-indentified patent and that said Letters Patent is hereby corrected as shown below:

On the title page, item 30, "2-85897" should be --2-85879--.

Signed and Sealed this

Fourth Day of October, 1994

Attest:

BRUCE LEHMAN

Attesting Officer        Commissioner of Patents and Trademarks